US010880926B2

(12) United States Patent
Xu et al.

(10) Patent No.: US 10,880,926 B2
(45) Date of Patent: Dec. 29, 2020

(54) METHOD, APPARATUS, AND SYSTEM FOR SENDING UPLINK INFORMATION IN IDLE MODE

(71) Applicant: Huawei Technologies Co., Ltd., Shenzhen (CN)

(72) Inventors: Bin Xu, Beijing (CN); Wei Quan, Beijing (CN); Bingzhao Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/054,618

(22) Filed: Aug. 3, 2018

(65) Prior Publication Data

US 2018/0343684 A1 Nov. 29, 2018

Related U.S. Application Data

(63) Continuation of application No. PCT/CN2016/073683, filed on Feb. 5, 2016.

(51) Int. Cl.

| | |
|---|---|
| ***H04W 74/08*** | (2009.01) |
| ***H04W 8/02*** | (2009.01) |
| ***H04W 72/04*** | (2009.01) |
| ***H04W 76/27*** | (2018.01) |

(52) U.S. Cl.

CPC ......... *H04W 74/0833* (2013.01); *H04W 8/02* (2013.01); *H04W 72/0413* (2013.01); *H04W 74/08* (2013.01); *H04W 76/27* (2018.02)

(58) Field of Classification Search

CPC ............. H04W 74/0833; H04W 74/08; H04W 72/0413; H04W 76/27; H04W 88/023

See application file for complete search history.

(56) References Cited

U.S. PATENT DOCUMENTS 7,873,005 B2 * 1/2011 Ahn .................... H04W 74/006 370/328
8,406,179 B2 * 3/2013 Kim .................... H04W 74/002 370/329

(Continued)

FOREIGN PATENT DOCUMENTS

CN 101674661 A 3/2010
CN 102316582 A 1/2012

(Continued)

OTHER PUBLICATIONS

3GPP TS 36.321 V13.0.0 (Dec. 2015), "3rd Generation Partnership Project; Technical Specification Group Radio Access Network; Evolved Universal Terrestrial Radio Access (E-UTRA); Medium Access Control (MAC) protocol specification (Release 13)", Dec. 2015, total 82 pages.

(Continued)

*Primary Examiner* — Charles C Jiang
*Assistant Examiner* — Thad N Defauw
(74) *Attorney, Agent, or Firm* — Slater Matsil, LLP

(57) ABSTRACT

A method includes: sending a random access request to an evolved NodeB eNB; receiving a random access response RAR returned by the eNB, where the RAR carries first resource information of a first uplink resource allocated by the eNB; and sending uplink information to the eNB based on the first uplink resource. The uplink information includes indication information and resource request information, or includes partial information of indication information and resource request information. The indication information includes at least one of location update information, service establishment information, attach request information, and detach request information of UE. The resource request information is used to request the eNB to allocate a second uplink resource to the UE.

19 Claims, 8 Drawing Sheets

UE
eNB
MME
601. UE sends a random access request to an eNB
602. The eNB receives the random access request sent by the UE
603. The eNB allocates a first uplink resource to the UE based on the random access request
604. The eNB sends an RAR to the UE, where the RAR carries first resource information of the allocated first uplink resource
605. The UE receives the RAR returned by the eNB
606. The UE sends uplink information to the eNB based on the first uplink resource, where the uplink information includes location update information of the UE
607. The eNB receives the uplink information sent by the UE based on the first uplink resource
608. The eNB sends the location update information and preset information to an MME
609. The MME updates location information of the UE based on the preset information
610. The MME sends a TAU accept message to the UE

(56) References Cited

U.S. PATENT DOCUMENTS

| | | | | |
|---|---|---|---|---|
| 8,451,781 | B2 * | 5/2013 | Jeong | H04W 74/002 370/329 |
| 2012/0147830 | A1 * | 6/2012 | Lohr | H04L 1/1854 370/329 |
| 2013/0322339 | A1 | 12/2013 | Ohta et al. | |
| 2015/0023281 | A1 * | 1/2015 | Wu | H04W 72/0473 370/329 |
| 2015/0282213 | A1 | 10/2015 | Sun et al. | |
| 2016/0150564 | A1 | 5/2016 | Quan et al. | |
| 2018/0007717 | A1 | 1/2018 | Sun et al. | |

FOREIGN PATENT DOCUMENTS

| | | | |
|---|---|---|---|
| CN | 103348756 | A | 10/2013 |
| WO | 2007148935 | A1 | 12/2007 |
| WO | 2014056426 | A1 | 4/2014 |
| WO | 2015013976 | A1 | 2/2015 |

OTHER PUBLICATIONS

3GPP TS 36.331 V13.0.0 (Dec. 2015), “3rd Generation Partnership Project; Technical Specification Group Radio Access Network; Evolved Universal Terrestrial Radio Access (E-UTRA); Radio Resource Control (RRC); Protocol specification (Release 13)”, Dec. 2015, total 138 pages.

3GPP TS 36.413 V13.1.0 (Dec. 2015), “3rd Generation Partnership Project; Technical Specification Group Radio Access Network; Evolved Universal Terrestrial Radio Access Network (E-UTRAN); S1 Application Protocol (S1AP) (Release 13)”, Dec. 2015, total 314 pages.

* cited by examiner

METHOD, APPARATUS, AND SYSTEM FOR SENDING UPLINK INFORMATION IN IDLE MODE

CROSS-REFERENCE TO RELATED APPLICATIONS

This application is a continuation of International Application No. PCT/CN2016/073683, filed on Feb. 5, 2016, the disclosure of which is hereby incorporated by reference in its entirety.

TECHNICAL FIELD

Embodiments of the present invention relate to the field of mobile communications technologies, and in particular, to a method, an apparatus, and a system for sending uplink information in an idle mode.

BACKGROUND

In a Long Term Evolution (LTE) system, user equipment (UE) has two modes: an idle mode (IDLE) and a connected mode (CONNECTED).

When UE in an idle mode sends indication information, the UE sends a random access request to an evolved NodeB (eNB). The eNB allocates an uplink resource to the UE based on the random access request, and the UE establishes a radio resource control (RRC) connection with the eNB based on the allocated uplink resource, and sends the indication information to the eNB by using the established RRC connection. The indication information is usually service information.

The foregoing information sending method includes at least the following problems:

In a process of sending the indication information, the UE sends the indication information after establishing the RRC connection. However, in the entire process, an uplink resource between the UE and the eNB in some steps is not fully used. In other words, there is a problem of an uplink resource waste in the current system.

SUMMARY

To resolve a problem of an uplink resource waste, embodiments of the present invention provide a method, an apparatus, and a system for sending uplink information in an idle mode. The technical solutions are as follows:

According to a first aspect, a method for sending uplink information in an idle mode is provided.

The method includes UE sends a random access request to an eNB. The eNB receives the random access request, allocates a first uplink resource to the UE based on the random access request, and feeds back first resource information of the allocated first uplink resource to the UE. After receiving the first resource information, the UE sends uplink information to the eNB based on the first uplink resource. The uplink information may include indication information and resource request information, or include partial information of indication information and resource request information. The indication information includes at least one of location update information, service establishment information, attach request information, and detach request information of the UE. The resource request information is used to request the eNB to allocate a second uplink resource to the UE, and the second uplink resource is used by the UE to send the indication information or remaining information other than the partial information in the indication information.

The uplink information is sent to the eNB based on a message 3 in a random access procedure, to resolve a prior-art problem of an uplink resource waste, and achieve an effect of fully using an uplink resource. In addition, there is no need to send the uplink information to the eNB based on the message 3 until an RRC connection is established, so that a transmission delay in a transmission process is shortened while reducing network signaling load.

Because the uplink information may include the indication information and the resource request information, or include the partial information of the indication information and the resource request information, the UE may send the uplink information based on the first uplink resource in the following three possible implementations.

In a first possible implementation of the first aspect, if the first uplink resource allocated by the eNB is capable of accommodating the indication information, that the UE sends uplink information to the eNB based on the first uplink resource includes:

The UE sends the indication information to the eNB by using the first uplink resource.

Correspondingly, the eNB may receive the indication information sent by the UE by using the first uplink resource.

In a second possible implementation of the first aspect, if the first uplink resource allocated by the eNB is incapable of accommodating the indication information, that the UE sends uplink information to the eNB based on the first uplink resource includes:

The UE sends the resource request information to the eNB by using the first uplink resource, where the resource request information includes a size of a resource capable of accommodating the indication information. Correspondingly, the eNB may receive the resource request information sent by the UE, and allocate a second uplink resource of a corresponding size to the UE based on the resource request information. Then, the eNB may feed back second resource information of the second uplink resource to the UE.

Correspondingly, the UE receives the second resource information of the second uplink resource allocated by the eNB. After receiving the second resource information, the UE sends the indication information to the eNB by using the second uplink resource.

In a third possible implementation of the first aspect, if the first uplink resource allocated by the eNB is incapable of accommodating the indication information, that the UE sends uplink information to the eNB based on the first uplink resource includes:

The UE sends the partial information of the indication information and the resource request information to the eNB by using the first uplink resource, where the resource request information includes a size of a resource capable of accommodating the remaining information of the indication information. Correspondingly, the eNB may receive the partial information of the indication information and the resource request information that are sent by the UE by using the first uplink resource. After receiving the resource request information, the eNB allocates a second uplink resource of a corresponding size to the UE based on the resource request information, and feeds back second resource information of the second uplink resource to the UE.

Correspondingly, the UE receives the second resource information of the second uplink resource allocated by the eNB. After receiving the second resource information, the UE sends the remaining information of the indication information to the eNB by using the second uplink resource.

In addition, with reference to any one of the first aspect, or the first possible implementation to the third possible implementation of the first aspect, in a fourth possible implementation, the indication information may include: an identity of the UE; or either of security verification information and an information type identifier and an identity of the UE, where the security verification information is used to instruct a network-side device to verify an identity of the UE, and the information type identifier is used to identify a type of the indication information.

With reference to any one of the first aspect, or the first possible implementation to the fourth possible implementation of the first aspect, in a fifth possible implementation, that UE sends a random access request to an evolved NodeB eNB includes the UE sends, to the eNB, a random access request that carries a randomly selected preamble. Correspondingly, the eNB receives the random access request sent by the UE, and allocates a first uplink resource of a default size to the UE after receiving the random access request.

Alternatively, the UE selects a target preamble based on the uplink information, and sends, to the eNB, a random access request that carries the target preamble. Correspondingly, the eNB receives the random access request sent by the UE, and allocates a first uplink resource to the UE after receiving the random access request. A size of the allocated first uplink resource is greater than a default size.

Alternatively, the UE selects a target channel based on the uplink information, and sends, to the eNB through the target channel, a random access request that carries a randomly selected preamble. Correspondingly, the eNB receives the random access request sent by the UE, and allocates a first uplink resource to the UE after receiving the random access request. A size of the allocated first uplink resource is greater than a default size.

Alternatively, the UE selects a target preamble and a target channel based on the uplink information, and sends, to the eNB through the target channel, a random access request that carries the target preamble. Correspondingly, the eNB receives the random access request sent by the UE, and allocates a first uplink resource to the UE after receiving the random access request. A size of the allocated first uplink resource is greater than a default size.

The target preamble and the target channel are used to instruct the eNB to allocate an uplink resource to the UE, and a resource size of the allocated uplink resource is greater than the default size.

According to a second aspect, an apparatus for sending uplink information in an idle mode is provided. The apparatus includes a processor, a transmitter connected to the processor, and a receiver connected to the processor. The processor is configured to execute an instruction. By executing the instruction, the processor performs the method for sending uplink information in an idle mode on a UE side in the first aspect.

According to a third aspect, an apparatus for sending uplink information in an idle mode is provided. The apparatus for sending uplink information in an idle mode includes a processor, a transmitter connected to the processor, and a receiver connected to the processor. The processor is configured to execute an instruction. By executing the instruction, the processor performs the method for sending uplink information in an idle mode on an eNB side in the first aspect.

According to a fourth aspect, an apparatus for sending uplink information in an idle mode is provided. The apparatus for sending uplink information in an idle mode includes at least one unit. The at least one unit is configured to perform the method for sending uplink information in an idle mode on a UE side in the first aspect.

According to a fifth aspect, an apparatus for sending uplink information in an idle mode is provided. The apparatus for sending uplink information in an idle mode includes at least one unit. The at least one unit is configured to perform the method for sending uplink information in an idle mode on an eNB side in the first aspect.

According to a sixth aspect, a system for sending uplink information in an idle mode is provided. The system includes UE and an eNB.

The UE includes the apparatus for sending uplink information in an idle mode in the second aspect, and the eNB includes the apparatus for sending uplink information in an idle mode in the third aspect.

Alternatively, the UE includes the apparatus for sending uplink information in an idle mode in the fourth aspect, and the eNB includes the apparatus for sending uplink information in an idle mode in the fifth aspect.

BRIEF DESCRIPTION OF THE DRAWINGS

To describe the technical solutions in the embodiments of the present invention more clearly, the following briefly describes the accompanying drawings for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following further describes the implementations of the present invention in detail with reference to the accompanying drawings.

Figure 1:
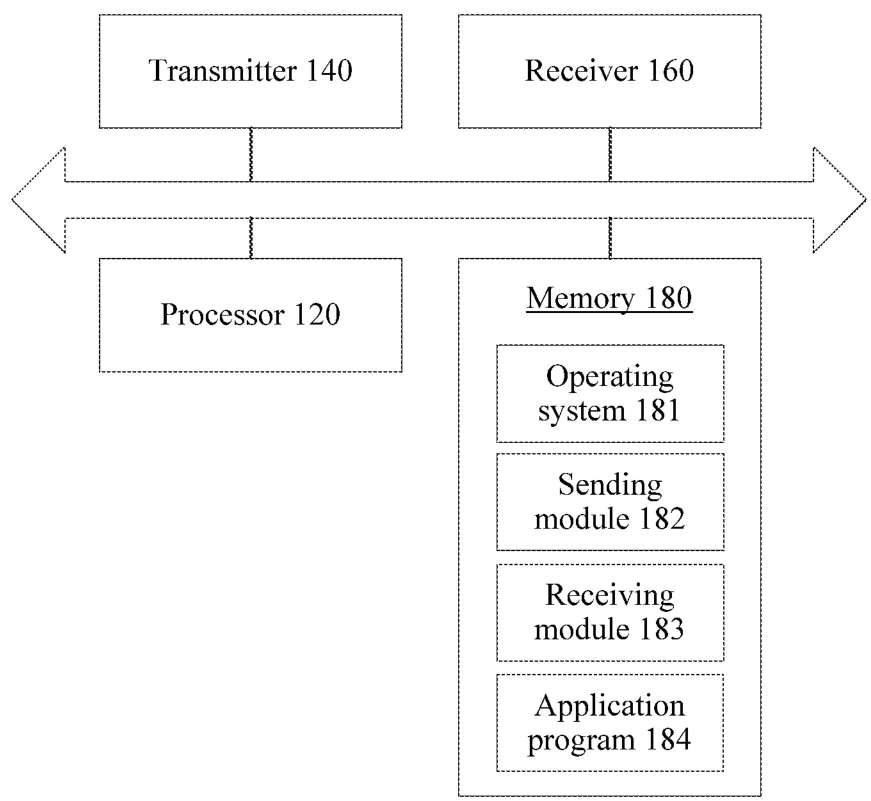
FIG. 1 is a schematic diagram of an apparatus for sending uplink information according to an embodiment of the present invention.

Referring to FIG. 1, FIG. 1 is a schematic structural diagram of an apparatus for sending uplink information in an idle mode according to an example of an embodiment of the present invention. The apparatus for sending uplink information may be implemented as all or a part of UE, and this embodiment is described by using an example in which the apparatus for sending uplink information is all of the UE. The UE includes a processor 120, a transmitter 140 connected to the processor 120, and a receiver 160 connected to the processor 120. Persons skilled in the art may understand that the structure of the UE shown in FIG. 1 does not constitute a limitation on the UE, and the UE may include components more or fewer than those shown in the figure, or may combine some components, or may have different component arrangements. For example, the UE further includes a memory 180, a power supply, and the like.

The processor 120 is a control center of the UE, and connects all parts of the entire UE by using various interfaces and lines. By running or executing a software program and/or a module stored in the memory 180 and by invoking data stored in the memory 180, the processor 120 executes various functions of the UE and processes data, to perform overall control on the UE. Optionally, the processor 120 may include one or more processing cores. Optionally, the processor 120 may integrate an application processor and a modem processor. The application processor mainly processes an operating system, a user interface, an application program, and the like. The modem processor mainly processes wireless communication. It may be understood that the modem processor may not be integrated into the processor 120, and the modem processor may be independently implemented as a chip.

The memory 180 may be applied to the software program and the module. By running the software program and the module stored in the memory 180, the processor 120 executes various function applications and processes data. The memory 180 may mainly include a program storage area and a data storage area. The program storage area may store an operating system 181, a sending module 182, a receiving module 183, an application program 184 required by at least one other function, and the like. The data storage area may store data (such as audio data or a phone book) created based on use of the UE. In addition, the memory 180 may be implemented by a volatile or non-volatile storage device of any type or a combination thereof.

The transmitter 140 may include a radio frequency transmit component such as an antenna. The transmitter 140 is configured to add data or information to a radio signal for sending. The radio signal may be a time-frequency resource in a mobile communications system.

The receiver 160 may include a radio frequency receive component such as an antenna. The receiver 160 is configured to receive data or the information carried in a radio signal. The radio signal may be a time-frequency resource in a mobile communications system.

It should be noted that the foregoing embodiment is merely described by using an example in which the apparatus for sending uplink information in an idle mode is implemented as all or a part of the UE. Optionally, the apparatus may be further implemented as all or a part of an eNB. In addition, when the apparatus is implemented as all or a part of the eNB, the program storage area in the memory 180 may further store an allocation module. Details are not described in this embodiment.

Figure 2:
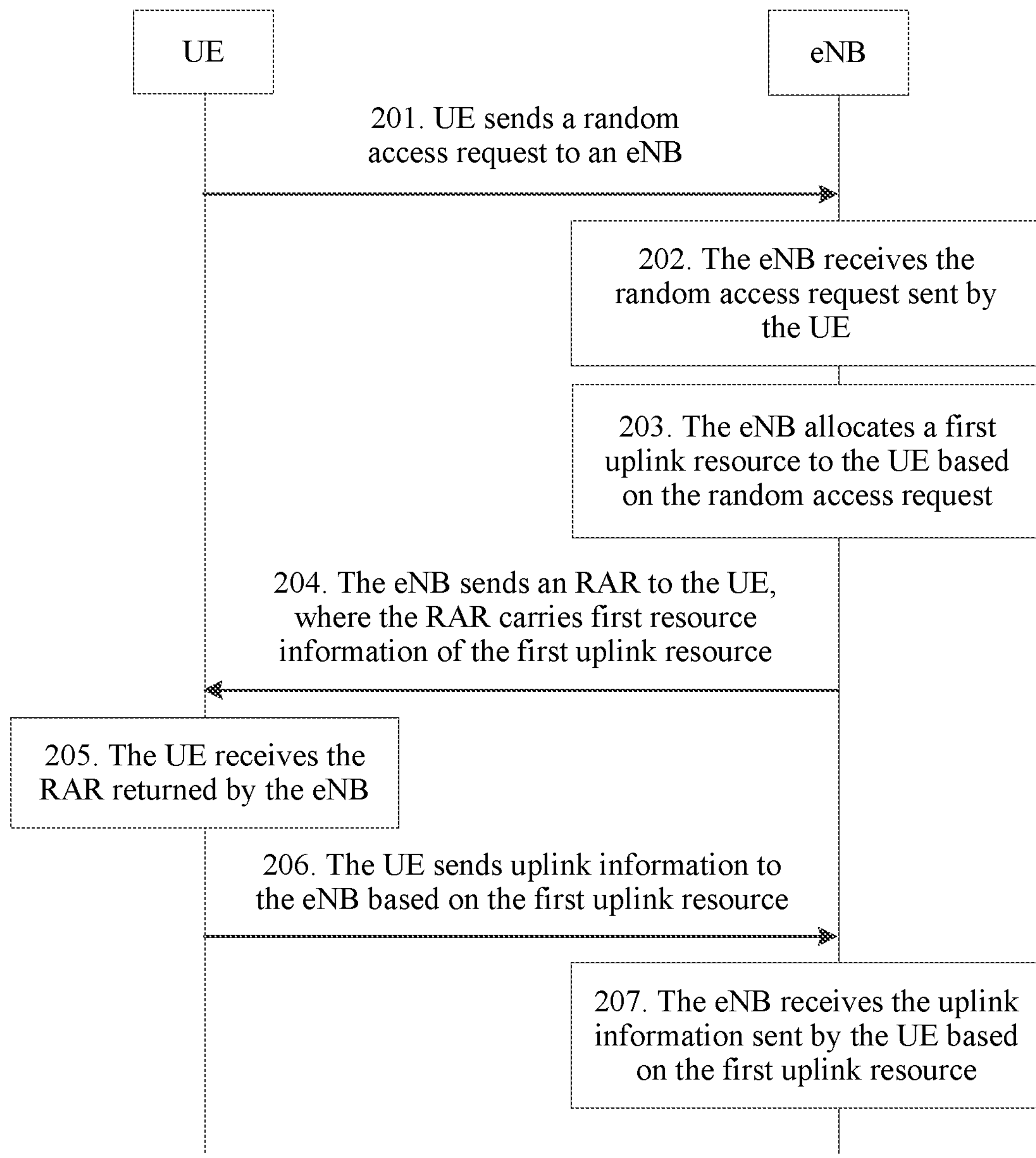
FIG. 2 is a flowchart of a method for sending uplink information in an idle mode according to an embodiment of the present invention.

Referring to FIG. 2, FIG. 2 is a method flowchart of a method for sending uplink information in an idle mode according to an embodiment of the present invention. As shown in FIG. 2, the method for sending uplink information in an idle mode includes the following steps:

Step 201: UE sends a random access request to an eNB.

Step 202: The eNB receives the random access request sent by the UE.

Step 203: The eNB allocates a first uplink resource to the UE based on the random access request.

Step 204: The eNB sends a random access response (RAR) to the UE, where the RAR carries first resource information of the first uplink resource.

Step 205: The UE receives the RAR returned by the eNB.

Step 206: The UE sends uplink information to the eNB based on the first uplink resource.

The uplink information includes indication information and resource request information, or includes partial information of indication information and resource request information. The indication information includes at least one of location update information, service establishment information, attach request information, and detach request information of the UE. The resource request information is used to request the eNB to allocate a second uplink resource to the UE, and the second uplink resource is used by the UE to send the indication information or remaining information other than the partial information in the indication information.

Step 207: The eNB receives the uplink information sent by the UE based on the first uplink resource.

In conclusion, in the method for sending uplink information provided in this embodiment, the uplink information is sent to the eNB based on a message 3 in a random access procedure, to resolve a prior-art problem of an uplink resource waste, and achieve an effect of fully using an uplink resource.

In addition, there is no need to send the uplink information to the eNB based on the message 3 until an RRC connection is established, so that a transmission delay in a transmission process is shortened while reducing network signaling load.

In the foregoing embodiment, the first uplink resource allocated by the eNB may be capable of accommodating the indication information, or may be incapable of accommodating the indication information. For the foregoing two cases, the UE may send the uplink information based on the first uplink resource in different manners. In other words, step 206 may be implemented in a plurality of manners. Specifically:

In a first manner, if the first uplink resource is capable of accommodating the indication information, the UE may directly send the uplink information to the eNB by using the first uplink resource.

In a second manner, if the first uplink resource is incapable of accommodating the indication information, the UE sends the resource request information to the eNB by using the first uplink resource, receives second resource information of the second uplink resource allocated by the eNB, and sends the indication information to the eNB by using the second uplink resource. The resource request information includes a size of a resource capable of accommodating the indication information.

In a third manner, if the first uplink resource is incapable of accommodating the indication information, the UE may send the partial information of the indication information and the resource request information to the eNB by using the first uplink resource, where the resource request information includes a size of a resource capable of accommodating the remaining information of the indication information; and receive second resource information of the second uplink resource allocated by the eNB, and send the remaining information of the indication information to the eNB by using the second uplink resource.

That the first uplink resource is capable of accommodating the indication information herein is as follows: A size of the first uplink resource is greater than or equal to a sum of a size of the indication information and a size of a header used when the indication information is sent. That the first uplink resource is incapable of accommodating the indication information herein is as follows: The size of the first uplink resource is less than the sum of the size of the indication information and the size of the header used when the indication information is sent.

The foregoing three manners are respectively described in the following three different embodiments.

Figure 3:
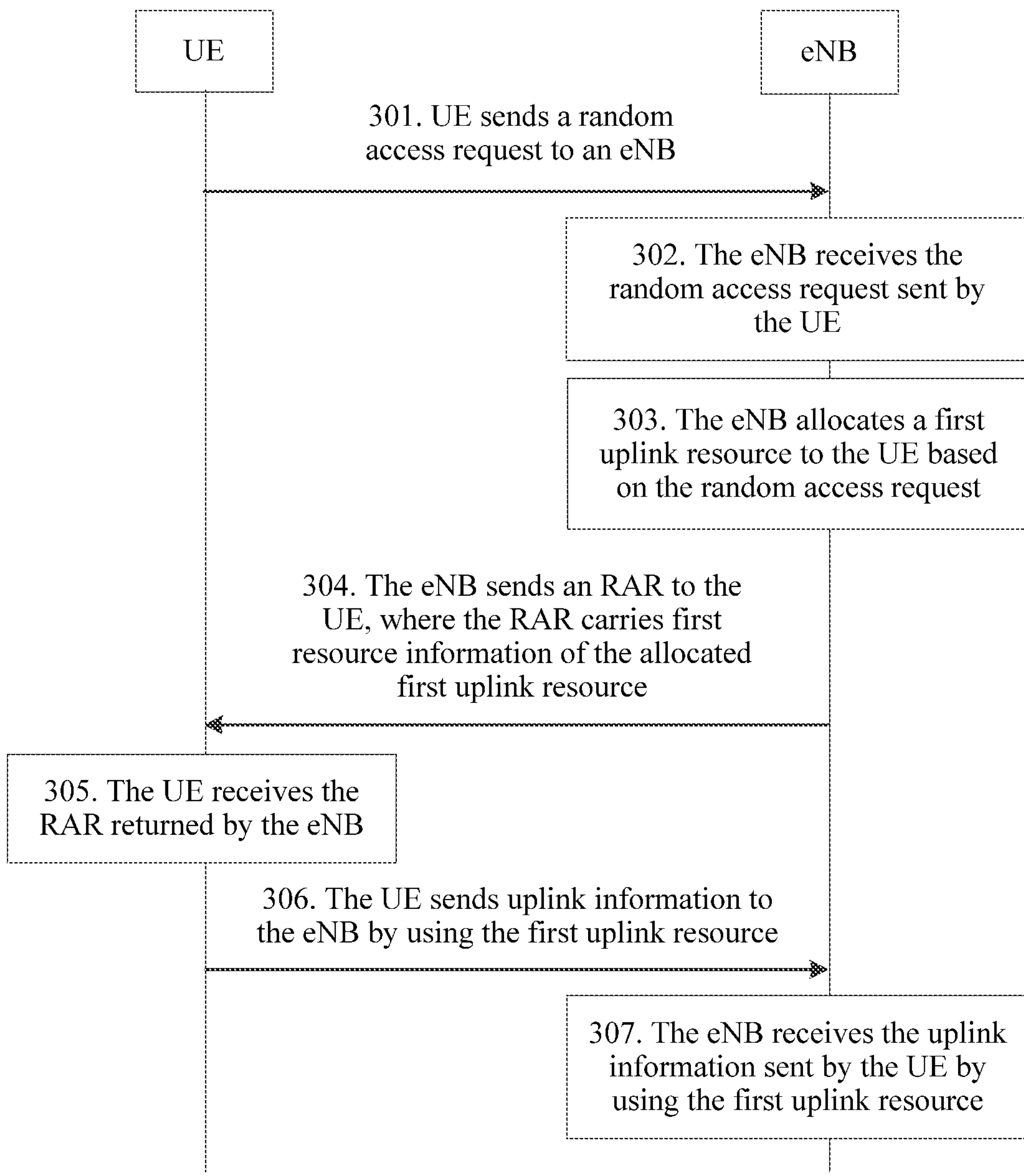
FIG. 3 is a flowchart of a method for sending uplink information in an idle mode according to another embodiment of the present invention.

Referring to FIG. 3, FIG. 3 is a method flowchart of a method for sending uplink information in an idle mode according to an embodiment of the present invention. This embodiment is described by using an example in which UE sends uplink information in the first manner. As shown in FIG. 3, the method for sending uplink information in an idle mode includes the following steps.

Step 301: UE sends a random access request to an eNB.

The UE in an idle mode needs to randomly access the eNB before the UE sends indication information. Specifically, the UE may send the random access request, namely, a message 1, to the eNB. The random access request is used to request to randomly access the eNB.

Step 302: The eNB receives the random access request sent by the UE.

Step 303: The eNB allocates a first uplink resource to the UE based on the random access request.

After the eNB receives the random access request sent by the UE, the eNB may allocate the first uplink resource to the UE based on the random access request.

Step 304: The eNB sends an RAR to the UE, where the RAR carries first resource information of the allocated first uplink resource.

In other words, the eNB sends a message 2 to the UE. The message 2 carries the first resource information of the allocated first uplink resource.

Step 305: The UE receives the RAR returned by the eNB.

Step 306: The UE sends uplink information to the eNB by using the first uplink resource.

After receiving the RAR, the UE may extract the first resource information of the first uplink resource from the RAR, and detect, based on the first resource information, whether the first uplink resource is capable of accommodating the indication information. If a detection result is that the first uplink resource is capable of accommodating the indication information, it indicates that the first uplink resource is enough for the UE to send the indication information. In this case, the UE may directly send the indication information to the eNB by using the first uplink resource. In other words, the UE may send, to the eNB, a message 3 that carries the indication information.

Optionally, the UE may send the indication information on a physical uplink shared channel (PUSCH) by using the first uplink resource.

The indication information usually includes an identity (ID) of the UE. The identity may be an SAE-temporary mobile subscriber identity (S-TMSI), a globally unique temporary identity (GUTI), a packet temporary mobile subscriber identity (P-TMSI), an international mobile subscriber identity (IMSI), an international mobile equipment identity (IMEI), a random number, or a cell radio network temporary identity (C-RNTI). Certainly, during actual implementation, the ID of the UE may alternatively be another parameter. This is not limited in this embodiment.

In addition, the indication information may further include other information, for example, security verification information and an information type identifier.

The security verification information is used to instruct a network-side device to verify an identity of the UE. The network-side device may be the eNB or a mobility management entity (MME). Specifically, when the eNB verifies the identity of the UE, the security verification information may be information generated by the UE based on a generation algorithm and an integrity protection parameter. The eNB may broadcast the generation algorithm and the integrity protection parameter of the security verification information. After the UE camps on a cell, the UE may correspondingly receive the foregoing information broadcast by the eNB, generate message authentication code for integrity (MAC-I) based on the received generation algorithm and integrity protection parameter, and determine the security verification information based on the MAC-I. Optionally, the UE may directly use the MAC-I as the security verification information. Certainly, to save the first uplink resource required when the security verification information is sent, the UE may further extract at least N bits from the MAC-I, for example, N least significant bits of the MAC-I, and use the extracted N bits as the security verification information. This is not limited in this embodiment. N may be a value such as 6, 8, or 16. This is also not limited in this embodiment. In addition, when the MME verifies the identity, the UE may first register with the MME to obtain a generation algorithm and an integrity protection parameter of the security verification information, and generate the security verification information based on the generation algorithm and the integrity protection parameter. Specifically, the generation algorithm is similar to the generation algorithm used when the eNB verifies the identity. Details are not described in this embodiment again.

The information type identifier is used to identify a type of the indication information. The type of the indication information includes at least one of location update information, service establishment information, attach request information, and detach request information of the UE. Optionally, in a possible implementation, the information type identifier may be a logical channel identifier (LCID). The LCID is different from a prior-art LCID used to identify a common control channel (CCCH). Specifically, the LCID may be a reserved LCID, or may be a newly added LCID. During actual implementation, the LCID may be carried in a MAC header of a Media Access Control control element (MAC CE). The MAC CE may be a buffer status report (BSR) MAC CE, a UE contention resolution identity MAC CE, a C-RNTI MAC CE, or another MAC CE. This is not limited in this embodiment. In another possible implementation, the information type identifier may be a flag bit. For example, the foregoing several types are respectively represented by flag bits: ‘1’, ‘2’, ‘3’, and ‘4’.

It should be noted that this embodiment is merely described by using an example in which the indication information includes the foregoing several types of information. Optionally, information included in the indication information may vary with a type of the indication information. For example, when the indication information is the location update information of the UE, the indication information may further include capability information of the UE and the like. This is not limited in this embodiment.

Step 307: The eNB receives the uplink information sent by the UE by using the first uplink resource. After the eNB receives the indication information, the eNB may perform, on the UE based on the information type identifier in the indication information, a subsequent processing procedure required by information corresponding to the information type identifier. This is not limited in this embodiment.

In conclusion, in the method for sending uplink information provided in this embodiment, the uplink information is sent to the eNB based on the message 3 in a random access procedure, to resolve a prior-art problem of an uplink resource waste, and achieve an effect of fully using an uplink resource.

In addition, there is no need to send the uplink information to the eNB based on the message 3 until an RRC connection is established, so that a transmission delay in a transmission process is shortened while reducing network signaling load.

Figure 4:
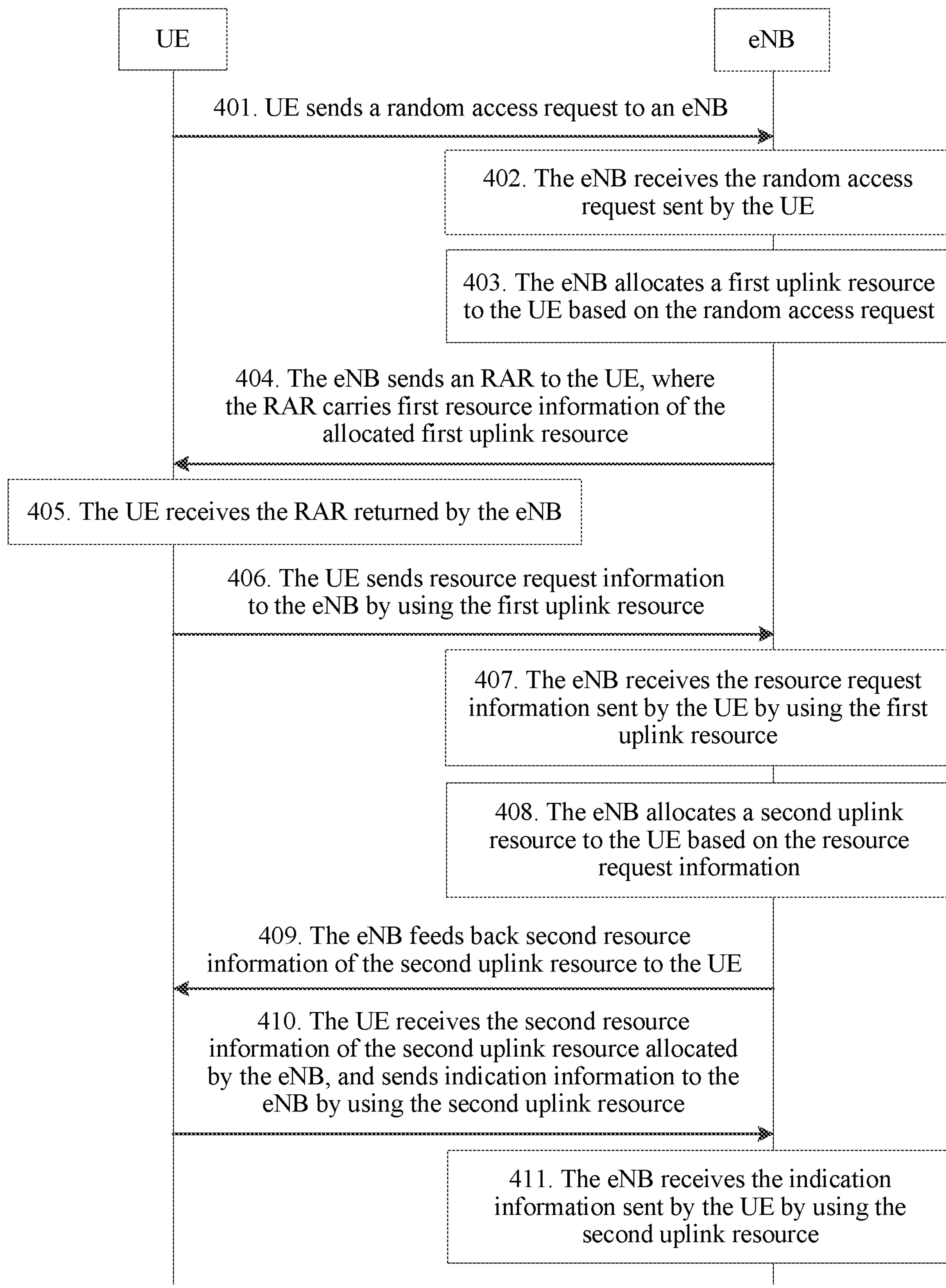
FIG. 4 is a flowchart of a method for sending uplink information in an idle mode according to still another embodiment of the present invention.

Referring to FIG. 4, FIG. 4 is a method flowchart of a method for sending uplink information in an idle mode according to an embodiment of the present invention. This embodiment is described by using an example in which UE sends uplink information in the second manner. As shown in FIG. 4, the method for sending uplink information in an idle mode includes the following steps.

Step 401: UE sends a random access request to an eNB.

Step 402: The eNB receives the random access request sent by the UE.

Step 403: The eNB allocates a first uplink resource to the UE based on the random access request.

Step 404: The eNB sends an RAR to the UE, where the RAR carries first resource information of the allocated first uplink resource.

Step 405: The UE receives the RAR returned by the eNB.

Step 401 to step 405 are similar to step 301 to step 305 in the foregoing embodiment. Details are not described in this embodiment again.

Step 406: The UE sends resource request information to the eNB by using the first uplink resource.

After the UE receives the RAR returned by the eNB, the UE may extract, from the RAR, the first resource information of the first uplink resource allocated by the eNB, and detect, based on the first resource information, whether the first uplink resource is capable of accommodating indication information. If a detection result is that the first uplink resource is incapable of accommodating the indication information, it indicates that the UE cannot completely send the indication information by using the first uplink resource. In this case, the UE may send the resource request information to the eNB. The resource request information includes a size of a resource capable of accommodating the indication information, and is used to request the eNB to allocate a second uplink resource of the size to the UE. To increase utilization of an uplink resource, the size included in the resource request information may be usually equal to a sum of a size of the indication information and a size of a header used when the indication information is sent.

During actual implementation, the UE may send an idle BSR to the eNB. The idle BSR includes the size of the resource capable of accommodating the indication information.

Step 407: The eNB receives the resource request information sent by the UE by using the first uplink resource.

Step 408: The eNB allocates a second uplink resource to the UE based on the resource request information.

A resource size of the allocated second uplink resource matches a size of a resource requested based on the resource request information. For example, if the resource size carried in the resource request information is 100 bits, the eNB can allocate a 100 bit second uplink resource.

Step 409: The eNB feeds back second resource information of the second uplink resource to the UE.

Optionally, the eNB may send the second resource information to the UE by sending a UL grant message. Specifically, the UL grant message may be sent on a physical downlink shared channel (PDSCH). Downlink control information (DCI) corresponding to the PDSCH is sent on the physical downlink control channel (PDCCH), and is scrambled by using a random access radio network temporary identifier (RA-RNTI).

Step 410: The UE receives the second resource information of the second uplink resource allocated by the eNB, and sends indication information to the eNB by using the second uplink resource.

Correspondingly, the UE may receive the second resource information sent by the eNB. Specifically, the UE may listen on the PDCCH, perform descrambling by using the RA-RNTI to obtain the DCI corresponding to the UL grant message, and receive the UL grant message from the PDSCH based on the DCI.

After the UE receives the UL grant message, the UE may send the indication information to the eNB based on the second uplink resource corresponding to the second resource information carried in the UL grant message. Optionally, the UE may send the indication information to the eNB on a PUSCH. Content of the indication information is similar to the content of the indication information in the foregoing embodiment. Details are not described in this embodiment again.

Step 411: The eNB receives the indication information sent by the UE by using the second uplink resource.

In conclusion, in the method for sending uplink information provided in this embodiment, when a first uplink resource corresponding to a message 3 is incapable of accommodating the indication information, the resource request information is first sent to the eNB in a random access procedure, so that the eNB allocates a second uplink resource of a corresponding size. In this way, the indication information is sent to the eNB by using the second uplink resource obtained through resource matching, to resolve a prior-art problem of an uplink resource waste, and achieve an effect of fully using an uplink resource.

In addition, there is no need to send the uplink information to the eNB based on the message 3 until an RRC connection is established, so that a transmission delay in a transmission process is shortened while reducing network signaling load.

Figure 5A:
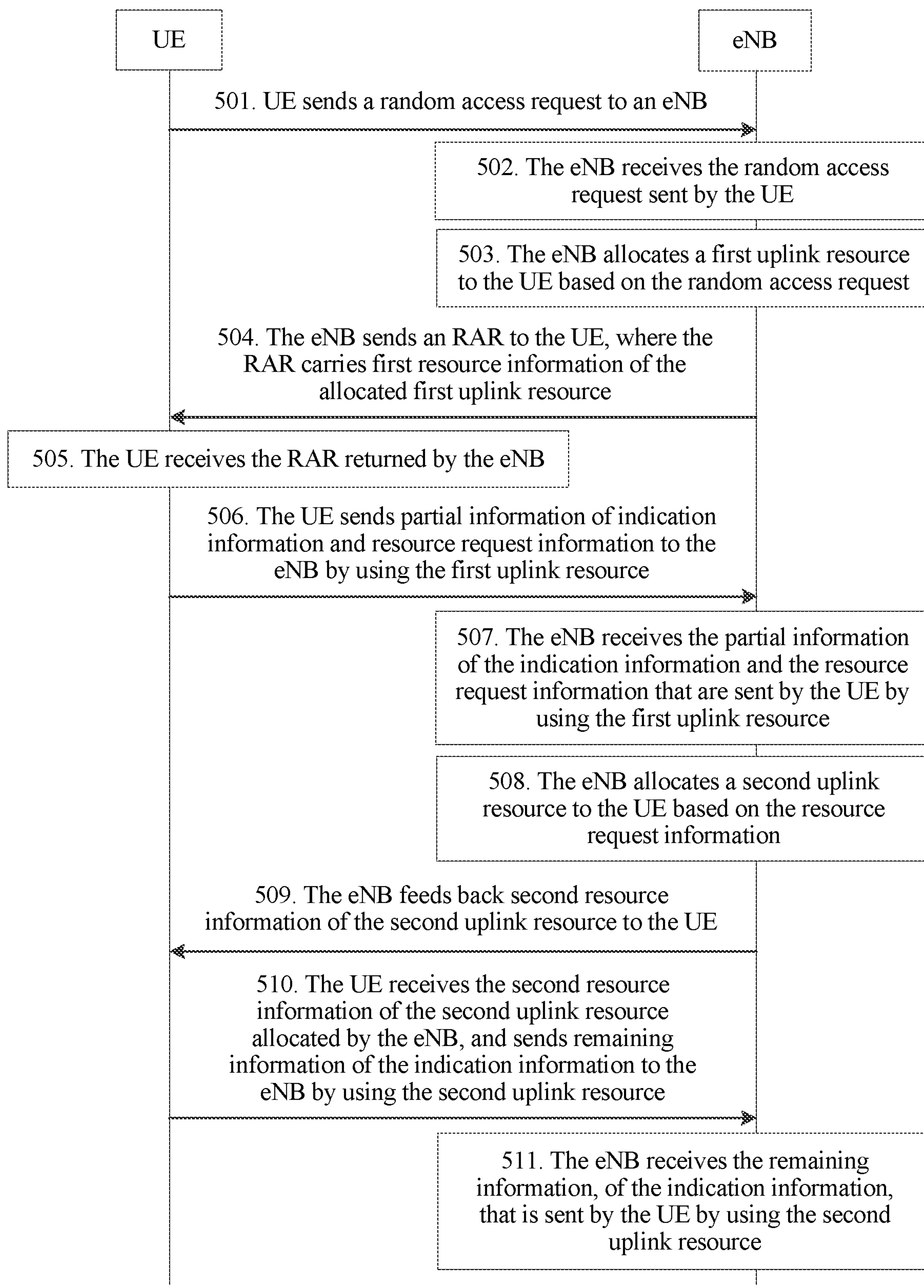
FIG. 5A is a flowchart of a method for sending uplink information in an idle mode according to still another embodiment of the present invention.

Referring to FIG. 5A, FIG. 5A is a method flowchart of a method for sending uplink information in an idle mode according to still another embodiment of the present invention. This embodiment is described by using an example in which UE sends uplink information in the third manner. As shown in FIG. 5A, the method for sending uplink information in an idle mode may include the following steps.

Step 501: UE sends a random access request to an eNB.

Step 502: The eNB receives the random access request sent by the UE.

Step 503: The eNB allocates a first uplink resource to the UE based on the random access request.

Step 504: The eNB sends an RAR to the UE, where the RAR carries first resource information of the allocated first uplink resource.

Step 505: The UE receives the RAR returned by the eNB.

Step 501 to step 505 are similar to step 301 to step 305 in the foregoing embodiment. Details are not described in this embodiment again.

Step 506: The UE sends partial information of indication information and resource request information to the eNB by using the first uplink resource.

After the UE receives the RAR returned by the eNB, the UE may extract, from the RAR, the first resource information of the first uplink resource allocated by the eNB, and detect, based on the first resource information, whether the first uplink resource is capable of accommodating the indication information. If a detection result is that the first uplink resource is incapable of accommodating the indication information, it indicates that the UE cannot completely send the indication information by using the first uplink resource. In this case, the UE may send the partial information of the indication information and the resource request information to the eNB. The resource request information includes a size of a resource capable of accommodating remaining information other than the already sent partial information in the indication information.

Figure 5B:
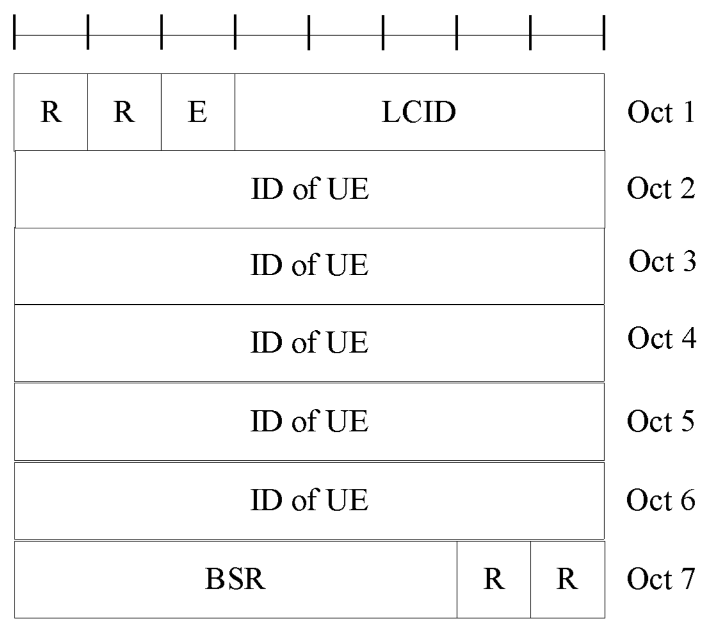
FIG. 5B is a schematic diagram of a data packet format used when UE sends resource request information to an eNB according to an embodiment of the present invention.

Similar to the foregoing embodiment, the UE may send an idle BSR to the eNB. For example, the first uplink resource is 56 bits, and the sent partial information of the indication information is an ID of the UE and an LCID. Referring to FIG. 5B, FIG. 5B shows a possible data packet format of a data packet sent by UE. As shown in FIG. 5B, the LCID is 5 bits, and the LCID is used to indicate that this random access of the eNB aims to send the idle BSR. The ID of the UE is 40 bits, and the BSR is 6 bits. The domain is used to report a size of a resource that needs to be allocated by using a request. A BSR index table used for the BSR is the same as a BSR index table used when the UE is in a connected mode. Assuming that the indication information that needs to be sent by the UE belongs to a same logical channel group (LCG), an extension (E) field is 1 bit, and a reserved (R) bit is 4 bits.

It should be noted that this embodiment is merely described by using an example in which the data packet format is the foregoing format. Optionally, the data packet may alternatively be in another format. This is not limited in this embodiment.

Step 507: The eNB receives the partial information of the indication information and the resource request information that are sent by the UE by using the first uplink resource.

Step 508: The eNB allocates a second uplink resource to the UE based on the resource request information.

A resource size of the second uplink resource matches a size of a resource requested based on the resource request information. For example, if the resource size carried in the resource request information is too bits, the eNB may allocate a second uplink resource whose size is equal to or slightly greater than too bits.

Step 509: The eNB feeds back second resource information of the second uplink resource to the UE.

This step is similar to step 409, and details are not described in this embodiment again.

Step 510: The UE receives the second resource information of the second uplink resource allocated by the eNB, and sends remaining information of the indication information to the eNB by using the second uplink resource.

This step is similar to step 410. However, different from step 410 in which all the content of the indication information is sent by using the second uplink resource, in step 506 in this embodiment, only the remaining information of the indication information needs to be sent because the partial information of the indication information is already sent.

Step 511: The eNB receives the remaining information, of the indication information, that is sent by the UE by using the second uplink resource.

In conclusion, in the method for sending uplink information provided in this embodiment, when a first uplink resource corresponding to a message 3 is incapable of accommodating the indication information, the partial information of the indication information and the resource request information are first sent to the eNB in a random access procedure, so that the eNB allocates a second uplink resource of a corresponding size. In this way, the indication information is sent to the eNB by using the second uplink resource obtained through resource matching, to resolve a prior-art problem of an uplink resource waste, and achieve an effect of fully using an uplink resource.

In addition, there is no need to send the uplink information to the eNB based on the message 3 until an RRC connection is established, so that a transmission delay in a transmission process is shortened while reducing network signaling load.

It should be noted that in the foregoing embodiments, the UE may send the random access request to the eNB in the following several manners.

In a first manner, the UE sends, to the eNB, a random access request that carries a randomly selected preamble. Correspondingly, the eNB receives the random access request, and allocates a first uplink resource of a default size to the UE.

The UE needs to select a code resource before the UE sends the random access request. Specifically, the UE may randomly select a preamble from a plurality of preset preambles, and then send, to the eNB, a random access request that carries the selected preamble.

During actual implementation, the UE may first detect whether the first uplink resource of the default size that is allocated by the eNB by default is capable of accommodating to-be-sent indication information. When a detection result is that the first uplink resource of the default size is capable of accommodating the indication information, the UE randomly selects the preamble from the plurality of preset preambles. For example, if the UE may prestore 64 preambles, the UE may randomly select a preamble from the 64 preambles.

Correspondingly, the eNB may receive the random access request sent by the UE. After receiving the random access request, the UE allocates the first uplink resource of the default size. The default size is usually 56 bits. This is not limited in this embodiment.

In a second manner, the UE selects a target preamble based on the uplink information, and sends, to the eNB, a random access request that carries the target preamble. The eNB receives the random access request, and allocates a first uplink resource to the UE. A resource size of the allocated first uplink resource is greater than a default size.

Before the UE selects the preamble, the UE may detect whether the first uplink resource of the default size that is allocated by the eNB by default is capable of accommodating to-be-sent indication information. When a detection result is that the first uplink resource of the default size is incapable of accommodating the indication information, to instruct the eNB to allocate a first uplink resource of a larger size, the UE may select a target preamble from a reserved special preamble, and then send, to the eNB, a random access request that carries the target preamble. The target preamble is used to instruct the eNB to allocate the first uplink resource to the UE, and the resource size of the allocated first uplink resource is greater than the default size.

For example, if six of 64 preambles in the UE are reserved as special preambles, and the six special preambles achieve a same effect, the UE may randomly select one thereof as the target preamble. Certainly, the special preamble may be further a newly added preamble other than the 64 preambles. This is not limited in this embodiment.

Correspondingly, after the eNB receives the random access request sent by the UE, the UE extracts the target preamble from the random access request, and allocates the first uplink resource to the UE based on the target preamble.

Specifically, in a possible implementation, the eNB may prestore a correspondence between each special preamble and a size of an uplink resource that needs to be allocated. After the target preamble is extracted from the random access request, the eNB allocates a first uplink resource of a corresponding size to the UE based on the correspondence. In another possible implementation, the eNB may allocate an uplink resource of a preset size based on the target preamble, and the preset size is greater than the default size.

In a third manner, the UE selects a target channel based on the uplink information, and sends, to the eNB through the target channel, a random access request that carries a randomly selected preamble. The eNB receives the uplink information sent by the UE through the target channel, and allocates a first uplink resource to the UE. A resource size of the allocated first uplink resource is greater than a default size.

Similar to the second manner, in addition to that the UE instructs, by using the target preamble, the eNB to allocate the uplink resource of the larger size, the UE may further send the random access request to the eNB through the target channel. In this way, after receiving the random access request sent by the UE through the target channel, the eNB can learn that the resource of the larger size needs to be allocated to the UE. The target channel may be a special physical random access channel (PRACH), namely, a special time-frequency resource, and may be a channel only used to send the indication information.

An allocation manner used by the eNB to allocate the first uplink resource is similar to the allocation manner in the second manner. For example, the eNB prestores a correspondence between a special PRACH resource and a size of an uplink resource that needs to be allocated. After receiving the random access request sent by the UE by using the target PRACH, the eNB allocates the first uplink resource to the UE based on the correspondence.

In a fourth manner, the UE selects a target preamble and a target channel based on the uplink information, and sends, to the eNB through the target channel, a random access request that carries the target preamble. The eNB receives the uplink information sent by the UE through the target channel, and allocates a first uplink resource to the UE. A resource size of the allocated first uplink resource is greater than a default size.

In a possible implementation, the UE may further select both a target preamble and a target PRACH, and then send, on the target PRACH, a random access request that carries the target preamble. Details are not described in this embodiment.

Certainly, during actual implementation, the UE may further send the random access request to the eNB in another manner. No enumeration is provided in this embodiment.

It should further be noted that after the eNB receives the indication information sent by the UE, the eNB may further perform the following steps:

First, the eNB feeds back a contention resolution message to the UE, where the contention resolution message is used to randomly access a contention resolution.

After the eNB successfully receives the uplink information, the eNB may send the contention resolution message to the UE. Specifically, the contention resolution message may carry the ID of the UE.

The eNB may feed back the contention resolution message to the UE on the PDSCH channel.

Second, the UE receives the contention resolution message fed back by the eNB.

The contention resolution message carries the ID of the UE. After the UE receives the contention resolution message, the UE can learn that the random access succeeds, and the indication information carried in the message 3 is also correctly sent to the eNB.

It should further be noted that in the foregoing embodiments, the indication information may include security verification information used to instruct a network-side device to verify an identity of the UE.

When the eNB verifies identity of the UE, after the eNB receives the security verification information sent by the UE, the eNB may obtain context information of the UE from an MME, generate security verification information based on a locally stored generation algorithm and security protection parameter of the security verification information, and detect whether the generated security verification information matches the received security verification information. If the generated security verification information matches the received security verification information, verification performed on the UE succeeds. If the generated security verification information does not match the received security verification information, verification fails, and the procedure ends.

When an MME verifies the identity of the UE, after the eNB receives the security verification information sent by the UE, the UE may forward the security verification information to the MME. The MME generates security verification information based on locally stored context information of the UE, and a generation algorithm and a security protection parameter of the security verification information, and detects whether the generated security verification information matches the received security verification information. If the generated security verification information matches the received security verification information, verification performed on the UE succeeds. If the generated security verification information does not match the received security verification information, verification fails, and the procedure ends.

Figure 6:
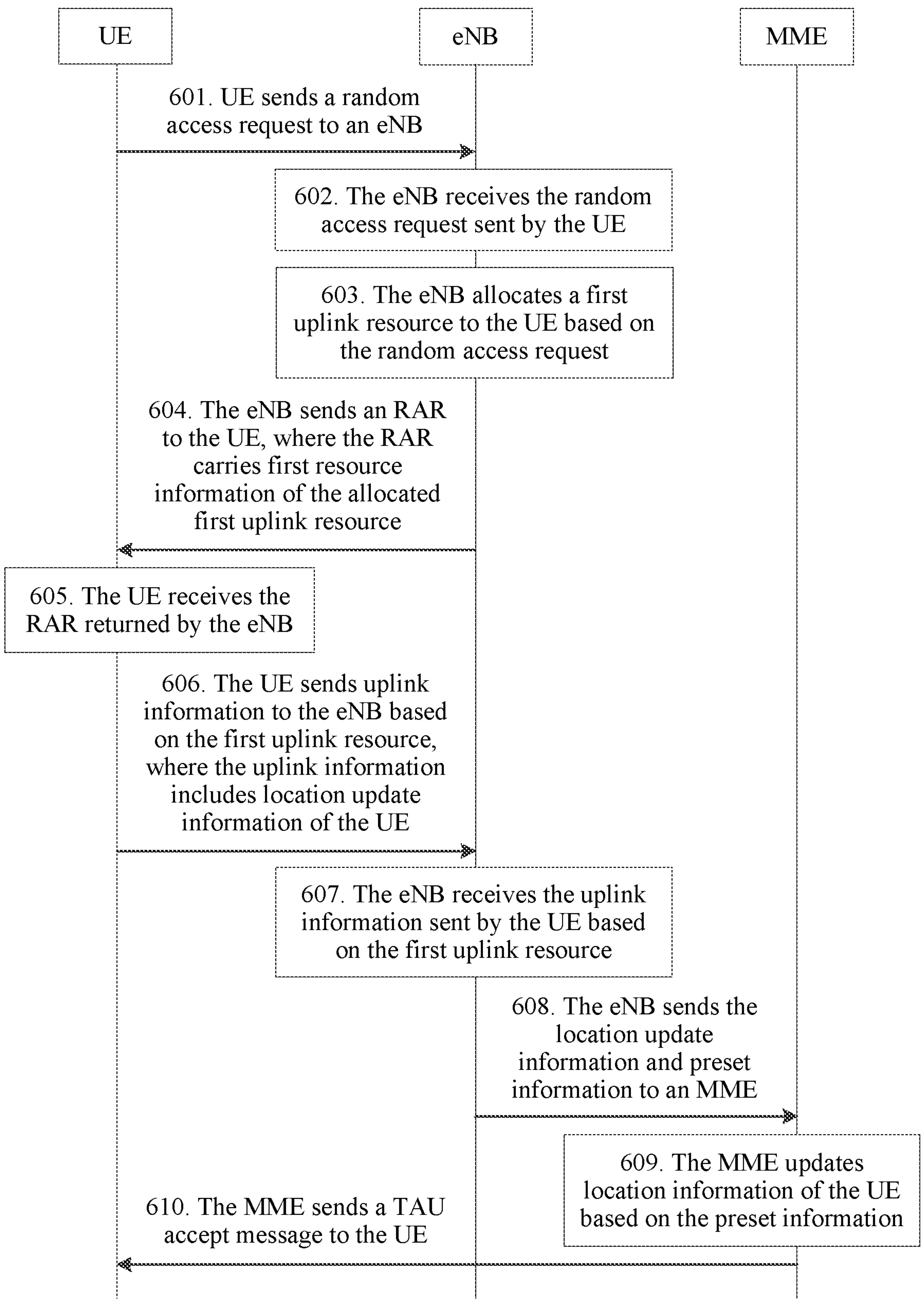
FIG. 6 is a flowchart of a method for sending uplink information in an idle mode according to still another embodiment of the present invention.

In addition, referring to FIG. 6, when the indication information is location update information of the UE, after the eNB receives the location update information, the eNB may further perform another related step. Specifically, the method for sending uplink information in an idle mode may include the following steps.

Step 601: UE sends a random access request to an eNB.

Step 602: The eNB receives the random access request sent by the UE.

Step 603: The eNB allocates a first uplink resource to the UE based on the random access request.

Step 604: The eNB sends an RAR to the UE, where the RAR carries first resource information of the allocated first uplink resource.

Step 605: The UE receives the RAR returned by the eNB.

Step 606: The UE sends uplink information to the eNB based on the first uplink resource, where the uplink information includes location update information of the UE.

Step 607: The eNB receives the uplink information sent by the UE based on the first uplink resource.

Step 601 to step 607 are similar to step 201 to step 207 in the foregoing embodiment. Details are not described in this embodiment again.

Step 608: The eNB sends the location update information and preset information to an MME.

After the eNB receives the location update information sent by the UE, the eNB may perform preset processing on the location update information. The preset processing may include at least one of adding a tracking area identity (TAI) of the UE, adding an ID of the eNB, and adding a cell identity of a cell in which the UE is located. Correspondingly, the preset information includes the at least one of the TAI of the UE, the identifier of the eNB, and the cell identity of the cell in which the UE is located.

The eNB sends location update information obtained after the preset processing to the MME. Specifically, the eNB generates an S1 interface message or a non-access stratum (NAS) message based on the processed location update information, and sends the processed location update information by sending the S1 interface message or the NAS message.

Step 609: The MME updates location information of the UE based on the preset information.

After receiving the location update information and the preset information, the MME updates the location information of the UE based on the preset information. Optionally, regardless of the TAI of the UE, the identifier of the eNB, or the cell identity of the cell in which the UE is located that is in the preset information, the MME may explicitly determine a current location of the UE based on the preset information. Therefore, the MME may update the location information of the UE based on the preset information. Specifically, the MME may generate a new tracking area (TA) list. In this way, the location update information is subsequently re-sent after the UE moves out of an area corresponding to the new TA list, and the MME determines a new paging range.

Step 610: The MME sends a tracking area update (TAU) accept message to the UE.

During actual implementation, the MME may send the TAU accept message to the eNB, and the eNB forwards the TAU accept message to the UE. This is not limited in this embodiment.

The TAU accept message may carry the TA list and a globally unique temporary identity (GUTI) of the UE. Message content of the TAU accept message is not limited in this embodiment.

It should be noted that this step is an optional step, and may be performed, or may not be performed during actual implementation. This is not limited in this embodiment.

In conclusion, in the method for sending uplink information in an idle mode provided in this embodiment, the location update information is sent to the eNB based on a message 3 in a random access procedure, the eNB forwards location update information that is simply processed to the MME, and the MME accordingly updates the location information of the UE. Therefore, a prior-art problem of an uplink resource waste is resolved, and an effect of fully using an uplink resource is achieved.

In addition, there is no need to send the uplink information to the eNB based on the message 3 until an RRC connection is established, so that a transmission delay in a transmission process is shortened while reducing network signaling load.

In addition, when the eNB forwards the location update information to the MME, the eNB also sends the preset information to the MME. The preset information is information used by the MME to determine a unique location of the UE. A prior-art problem is resolved: Update efficiency is relatively low because after the MME receives the TAU request forwarded by the eNB, the MME needs to perform a series of complicated query and determining to update the location of the UE. Therefore, after the MME receives the location update information and the preset information, the MME may simply and conveniently update the location of the UE based on the preset information, to improve the update efficiency.

It should be noted that in the foregoing embodiments, the steps on the UE side may be independently implemented as the method for sending uplink information in an idle mode on the UE side, the steps may be independently implemented as the method for sending uplink information in an idle mode on an eNB side, and the steps on the MME side may be independently implemented as the method for sending uplink information in an idle mode on the MME side.

Figure 7:
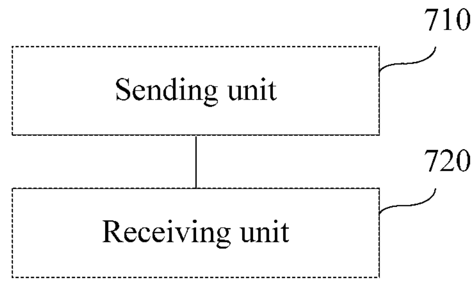
FIG. 7 is a block diagram of an apparatus for sending uplink information in an idle mode according to an embodiment of the present invention.

Referring to FIG. 7, FIG. 7 is a block diagram of an apparatus for sending uplink information in an idle mode according to an embodiment of the present invention. The apparatus for sending uplink information in an idle mode may be applied to UE. As shown in FIG. 7, the apparatus for sending uplink information in an idle mode may include a sending unit 710 and a receiving unit 720.

The sending unit 710 is configured to send a random access request to an evolved NodeB eNB.

The receiving unit 720 is configured to receive a random access response RAR returned by the eNB. The RAR carries first resource information of a first uplink resource allocated by the eNB.

The sending unit 710 is further configured to send uplink information to the eNB based on the first uplink resource.

The uplink information includes indication information and resource request information, or includes partial information of indication information and resource request information. The indication information includes at least one of location update information, service establishment information, attach request information, and detach request information of the UE. The resource request information is used to request the eNB to allocate a second uplink resource to the UE, and the second uplink resource is used by the UE to send the indication information or remaining information other than the partial information in the indication information.

In a first possible implementation of this embodiment, if the first uplink resource allocated by the eNB is capable of accommodating the indication information, the sending unit 710 is further configured to send the indication information to the eNB by using the first uplink resource.

In a second possible implementation of this embodiment, if the first uplink resource allocated by the eNB is incapable of accommodating the indication information, the sending unit 710 is further configured to send the resource request information to the eNB by using the first uplink resource. The resource request information includes a size of a resource capable of accommodating the indication information. The sending unit is further configured to receive second resource information of the second uplink resource allocated by the eNB, and send the indication information to the eNB by using the second uplink resource.

In a third possible implementation of this embodiment, if the first uplink resource allocated by the eNB is incapable of accommodating the indication information. The sending unit 710 is further configured to send the partial information of the indication information and the resource request information to the eNB by using the first uplink resource. The resource request information includes a size of a resource capable of accommodating the remaining information of the indication information. The sending unit is further configured to receive second resource information of the second uplink resource allocated by the eNB, and send the remaining information of the indication information to the eNB by using the second uplink resource.

In a fourth possible implementation of this embodiment, the indication information includes an identity of the UE; or either of security verification information and an information type identifier and an identity of the UE, where the security verification information is used to instruct a network-side device to verify an identity of the UE, and the information type identifier is used to identify a type of the indication information.

In a fifth possible implementation of this embodiment, the sending unit 710 is further configured to send, to the eNB, a random access request that carries a randomly selected preamble; or select a target preamble based on the uplink information, and send, to the eNB, a random access request that carries the target preamble; or select a target channel based on the uplink information, and send, to the eNB through the target channel, a random access request that carries a randomly selected preamble; or select a target preamble and a target channel based on the uplink information, and send, to the eNB through the target channel, a random access request that carries the target preamble.

The target preamble and the target channel are used to instruct the eNB to allocate an uplink resource to the UE, and a resource size of the allocated uplink resource is greater than a default size.

In conclusion, the apparatus for sending uplink information in an idle mode provided in this embodiment sends the uplink information to the eNB based on a message 3 in a random access procedure, to resolve a prior-art problem of an uplink resource waste, and achieve effects of fully using an uplink resource and reducing network signaling load.

In addition, there is no need to send the uplink information to the eNB based on the message 3 until an RRC connection is established, so that a transmission delay in a transmission process is shortened.

Figure 8:
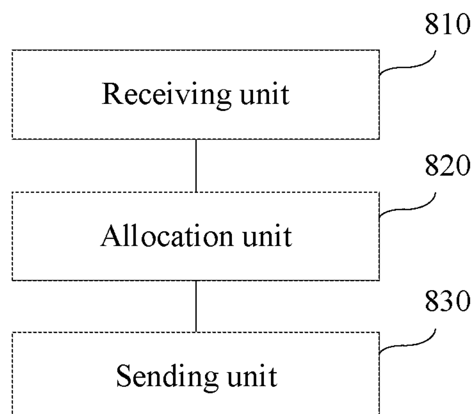
FIG. 8 is a block diagram of an apparatus for sending uplink information in an idle mode according to an embodiment of the present invention.

Referring to FIG. 8, FIG. 8 is a block diagram of an apparatus for sending uplink information in an idle mode according to an embodiment of the present invention. The apparatus for sending uplink information in an idle mode may be applied to an eNB. As shown in FIG. 8, the apparatus for sending uplink information in an idle mode may include a receiving unit 810, an allocation unit 820, and a sending unit 830.

The receiving unit 810 is configured to receive a random access request sent by user equipment UE.

The allocation unit 820 is configured to allocate a first uplink resource to the UE based on the random access request.

The sending unit 830 is configured to send a random access response RAR to the UE. The RAR carries first resource information of the first uplink resource.

The receiving unit 810 is further configured to receive uplink information sent by the UE based on the first uplink resource.

The uplink information includes indication information and resource request information, or includes partial information of indication information and resource request information. The indication information includes at least one of location update information, service establishment information, attach request information, and detach request information of the UE. The resource request information is used to request the eNB to allocate a second uplink resource to the UE, and the second uplink resource is used by the UE to send the indication information or remaining information other than the partial information in the indication information.

In a first possible implementation of this embodiment, the receiving unit 810 is further configured to receive the uplink information sent by the UE by using the first uplink resource.

In a second possible implementation of this embodiment, the receiving unit 810 is further configured to receive the resource request information sent by the UE by using the first uplink resource, where the resource request information includes a size of a resource capable of accommodating the indication information. The receiving unit 810 is further configured to allocate the second uplink resource to the UE based on the resource request information, where a resource size of the second uplink resource matches a size of a resource requested based on the resource request information; feed back second resource information of the second uplink resource to the UE; and receive the indication information sent by the second UE by using the second uplink resource.

In a third possible implementation of this embodiment, the receiving unit 810 is further configured to: receive the partial information of the indication information and the resource request information that are sent by the UE by using the first uplink resource. The resource request information includes a size of a resource capable of accommodating the remaining information of the indication information. The receiving unit 810 is further configured to allocate the second uplink resource to the UE based on the resource request information, where a resource size of the second uplink resource matches a size of a resource requested based on the resource request information. The receiving unit 810 is further configured to feed back second resource information of the second uplink resource to the UE; and receive the remaining information, of the indication information, that is sent by the second UE by using the second uplink resource.

In a fourth possible implementation of this embodiment, the indication information includes an identity of the UE or either of security verification information and an information type identifier and an identity of the UE, where the security verification information is used to instruct a network-side device to verify an identity of the UE, and the information type identifier is used to identify a type of the indication information.

In a fifth possible implementation of this embodiment, the allocation unit 820 is further configured to if the random access request carries a randomly selected preamble, allocate an uplink resource of a default size to the UE. The allocation unit 820 is further configured to if the random access request carries a target preamble, allocate an uplink resource to the UE, where a resource size of the allocated uplink resource is greater than a default size. The allocation unit 820 is further configured to if the random access request is a request sent by the UE by using a target channel, allocate an uplink resource to the UE, where a resource size of the allocated uplink resource is greater than a default size. The allocation unit 820 is further configured to if the random access request is a request that is sent by the UE by using a target channel and that carries a target preamble, allocate an uplink resource to the UE, where a resource size of the allocated uplink resource is greater than a default size.

In a sixth possible implementation of this embodiment, when the indication information is the location update information of the UE, the sending unit 830 is further configured to send the location update information and preset information to a mobility management entity MME. The preset information includes at least one of a tracking area identity TAI of the UE, an identifier of the eNB, and a cell identity of a cell in which the UE is located, and the MME updates location information of the UE based on the preset information.

In conclusion, the apparatus for sending uplink information in an idle mode provided in this embodiment sends the uplink information to the eNB based on a message 3 in a random access procedure, to resolve a prior-art problem of an uplink resource waste, and achieve effects of fully using an uplink resource and reducing network signaling load.

In addition, there is no need to send the uplink information to the eNB based on the message 3 until an RRC connection is established, so that a transmission delay in a transmission process is shortened.

Figure 9:
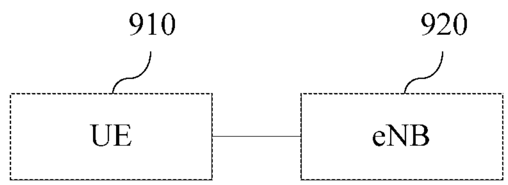
FIG. 9 is a block diagram of a system for sending uplink information in an idle mode according to an embodiment of the present invention.

Referring to FIG. 9, FIG. 9 is a block diagram of a system for sending uplink information in an idle mode according to an embodiment of the present invention. As shown in FIG. 9, the system for sending uplink information in an idle mode may include UE 910 and eNB 920.

The UE 910 may include the apparatus, shown in FIG. 1, for sending uplink information in an idle mode that is implemented as UE, and the eNB 920 may include the apparatus, shown in FIG. 1, for sending uplink information in an idle mode that is implemented as an eNB.

Alternatively, the UE 910 may include the apparatus, shown in FIG. 7, for sending uplink information in an idle mode, and the eNB includes the apparatus, shown in FIG. 8, for sending uplink information in an idle mode.

In conclusion, the system for sending uplink information in an idle mode provided in this embodiment sends uplink information to the eNB based on a message 3 in a random access procedure, to resolve a prior-art problem of an uplink resource waste, and achieve effects of fully using an uplink resource and reducing network signaling load.

In addition, there is no need to send the uplink information to the eNB based on the message 3 until an RRC connection is established, so that a transmission delay in a transmission process is shortened.

It should be understood that, unless the context clearly supports an exception, a single form "one" ("a", "an", and "the") used herein also intends to include a plural form. It should be further understood that "and/or" used herein intends to include any and all possible combinations of one or more correlated items that are listed.

The sequence numbers of the foregoing embodiments of the present invention are merely for illustrative purposes, and are not intended to indicate priorities of the embodiments.

Persons of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present invention, but are not intended to limit the present invention. Any modification, equivalent replacement, and improvement made without departing from the spirit and principle of the present invention shall fall within the protection scope of the present invention.

What is claimed is:

1. A method for sending uplink information in an idle mode, the method comprising:

sending a random access request to an evolved NodeB (eNB);

receiving a random access response (RAR) returned by the eNB, wherein the RAR carries first resource information of a first uplink resource allocated by the eNB;

detecting whether the first uplink resource in the RAR is capable of accommodating indication information that is to be sent to the eNB, wherein the indication information comprises location update information of a user equipment (UE), or service establishment information of the UE;

sending, when detecting that the first uplink resource is capable of accommodating the indication information, the indication information to the eNB in a message 3 using the first uplink resource; and when detecting that the first uplink resource is incapable of accommodating the indication information, sending resource request information to the eNB in the message 3 using the first uplink resource, the resource request information comprising a resource size and requesting the eNB to allocate a second uplink resource of the resource size to the UE;

receiving, in response to sending the resource request information, an allocation of the second uplink resource from the eNB;

sending the indication information to the eNB using the second uplink resource; and detecting, after sending the indication information to the eNB using the second uplink resource, a contention resolution message from the eNB.

2. The method according to claim 1, wherein detecting whether the first uplink resource is capable of accommodating the indication information comprises:

detecting whether a size of the first uplink resource is greater than or equal to a sum of a size of the indication information and a size of a header used when the indication information is sent.

3. The method according to claim 1, wherein sending the indication information comprises:

sending the indication information to the eNB by using the second uplink resource without using the first uplink resource, when the first uplink resource allocated by the eNB is incapable of accommodating the indication information.

4. The method according to claim 1, wherein sending the resource request information to the eNB comprises:

sending partial information of the indication information and the resource request information to the eNB by using the first uplink resource in the message 3, wherein the resource request information comprises the resource size of a resource capable of accommodating remaining information of the indication information; and wherein sending the indication information comprises sending remaining information of the indication information to the eNB by using the second uplink resource, when the first uplink resource allocated by the eNB is incapable of accommodating the indication information.

5. The method according to claim 1, wherein the indication information comprises:

an identity of the UE; or security verification information; or an information type identifier; or an identity of the UE, wherein the security verification information is used to instruct a network-side device to verify an identity of the UE, and wherein the information type identifier is used to identify a type of the indication information.

6. The method according to claim 1, wherein sending the random access request to the eNB comprises:

sending, to the eNB, the random access request that carries a randomly selected preamble; or selecting a target preamble based on uplink information to be sent to the eNB, and sending, to the eNB, the random access request that carries the target preamble; or selecting a target channel based on the uplink information, and sending, to the eNB through the target channel, the random access request that carries a randomly selected preamble; or selecting a target preamble and a target channel based on the uplink information, and sending, to the eNB through the target channel, the random access request that carries the target preamble, wherein the target preamble and the target channel are used to instruct the eNB to allocate an uplink resource to the UE, and wherein a resource size of the allocated uplink resource is greater than a default size.

7. A method for sending uplink information in an idle mode, the method comprising:

receiving, by an evolved NodeB (eNB), a random access request sent by user equipment (UE);

allocating, by the eNB, a first uplink resource to the UE based on the random access request;

sending, by the eNB, a random access response (RAR) to the UE, wherein the RAR carries first resource information of the first uplink resource; and receiving, by the eNB, uplink information sent by the UE in a message $_3$ based on the first uplink resource;

wherein the uplink information comprises indication information when the first uplink resource is capable of accommodating the indication information, wherein the indication information comprises location update information of the UE, or service establishment information or the UE; and wherein, when the first uplink resource is incapable of accommodating the indication information, the uplink information comprises resource request information, the resource request information comprising a resource size and requesting the eNB to allocate, after the eNB allocates the first uplink resource, a second uplink resource of the resource size to the UE, and the method further comprises:

sending, by the eNB in response to receiving the resource request information, an allocation of the second uplink resource to the UE; and receiving, by the eNB, the indication information from the UE in the second uplink resource; and transmitting, by the eNB after receiving the indication information from the UE in the second uplink resource, a contention resolution message to the UE.

8. The method according to claim 7, wherein receiving the uplink information sent by the UE based on the first uplink resource comprises receiving the indication information sent by the UE by using the first uplink resource.

9. The method according to claim 7, further comprising:

receiving the resource request information sent the by the UE by using the first uplink resource, wherein the resource request information comprises the resource size of a resource capable of accommodating the indication information;

allocating the second uplink resource to the UE based on the resource request information, wherein a resource size of the second uplink resource matches the resource size of the resource requested based on the resource request information; and receiving the indication information sent by the UE using the second uplink resource without using the first uplink resource.

10. The method according to claim 7, further comprising:

receiving partial information of the indication information and the resource request information that are sent by the UE using the first uplink resource, wherein the resource request information comprises the resource size of a resource capable of accommodating remaining information of the indication information;

allocating the second uplink resource to the UE based on the resource request information, wherein a resource size of the second uplink resource matches the resource size of the resource requested based on the resource request information;

feeding back second resource information of the second uplink resource to the UE; and receiving remaining information of the indication information that is sent by the UE using the second uplink resource.

11. The method according to claim 7, wherein the indication information comprises:

an identity of the UE; or security verification information; or an information type identifier; or an identity of the UE, wherein the security verification information is used to instruct a network-side device to verify an identity of the UE, and wherein the information type identifier is used to identify a type of the indication information.

12. The method according to claim 7, wherein allocating the first uplink resource to the UE based on the random access request comprises:

when the random access request carries a randomly selected preamble, allocating an uplink resource of a default size to the UE;

when the random access request carries a target preamble, allocating an uplink resource to the UE, wherein a resource size of the allocated uplink resource is greater than a default size;

when the random access request is a request sent by the UE by using a target channel, allocating an uplink resource to the UE, wherein a resource size of the allocated uplink resource is greater than a default size; or when the random access request is a request that is sent by the UE by using a target channel and that carries a target preamble, allocating an uplink resource to the UE, wherein a resource size of the allocated uplink resource is greater than a default size.

13. The method according to claim 7, further comprising sending the location update information and preset information to a mobility management entity (MME) when the indication information is the location update information of the UE, wherein the preset information comprises at least one of a tracking area identity (TAI) of the UE, an identifier of the eNB, or a cell identity of a cell in which the UE is located, and wherein the MME updates location information of the UE based on the preset information.

14. User equipment (UE) comprising:

a processor;

a non-transitory computer-readable storage medium storing a program to be executed by the processor;

a transmitter configured to send a random access request to an evolved NodeB (eNB); and a receiver configured to receive a random access response (RAR) returned by the eNB, the RAR carrying first resource information of a first uplink resource allocated by the eNB, wherein the processor is configured to detect whether the first uplink resource in the RAR is capable of accommodating indication information that is to be sent to the eNB, the indication information comprising location update information of the UE, or service establishment information of the UE, wherein the transmitter is further configured to:

when detecting, by the processor, that the first uplink resource is capable of accommodating the indication information, send the indication information to the eNB in a message 3 using the first uplink resource; and when detecting, by the processor, that the first uplink resource is incapable of accommodating the indication information, send resource request information to the eNB in the message 3 using the first uplink resource, the resource request information comprising a resource size and requesting the eNB to allocate a second uplink resource of the resource size to the UE, receive, in response to sending the resource request information, an allocation of the second uplink resource from the eNB, send the indication information to the eNB using the second uplink resource, and detect, after sending the indication information to the eNB using the second uplink resource, a contention resolution message from the eNB.

15. The UE according to claim 14, wherein detecting whether the first uplink resource is capable of accommodating the indication information comprises:

detecting whether a size of the first uplink resource is greater than or equal to a sum of a size of the indication information and a size of a header used when the indication information is sent.

16. The UE according to claim 14, wherein the transmitter is further configured to:

send the indication information to the eNB by using the second uplink resource without using the first uplink resource, when the first uplink resource allocated by the eNB is incapable of accommodating the indication information.

17. The UE according to claim 14, wherein the transmitter is further configured to:

send partial information of the indication information and the resource request information to the eNB by using the first uplink resource, wherein the resource request information comprises the resource size of a resource capable of accommodating remaining information of the indication information; and wherein sending the indication information comprises sending remaining information of the indication information to the eNB by using the second uplink resource, when the first uplink resource allocated by the eNB is incapable of accommodating the indication information.

18. The UE according to claim 14, wherein the indication information comprises:

an identity of the UE; or security verification information; or an information type identifier; or an identity of the UE, wherein the security verification information is used to instruct a network-side device to verify an identity of the UE, and wherein the information type identifier is used to identify a type of the indication information.

19. The UE according to claim 14, wherein the transmitter is further configured to:

send, to the eNB, the random access request that carries a randomly selected preamble; or select a target preamble based on uplink information, and send, to the eNB, the random access request that carries the target preamble; or select a target channel based on uplink information to be sent to the eNB, and send, to the eNB through the target channel, the random access request that carries a randomly selected preamble; or select a target preamble and a target channel based on the uplink information, and send, to the eNB through the target channel, the random access request that carries the target preamble, wherein the target preamble and the target channel are used to instruct the eNB to allocate an uplink resource to the UE, and wherein a resource size of the allocated uplink resource is greater than a default size.

* * * * *

UNITED STATES PATENT AND TRADEMARK OFFICE

CERTIFICATE OF CORRECTION

PATENT NO. : 10,880,926 B2
APPLICATION NO. : 16/054618
DATED : December 29, 2020
INVENTOR(S) : Xu et al.

It is certified that error appears in the above-identified patent and that said Letters Patent is hereby corrected as shown below:

In the Claims

In Column 21, Line 43, Claim 7, delete “message $_3$” and insert --message 3--.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*